(12) United States Patent
Nakahara et al.

(10) Patent No.: US 11,681,626 B2
(45) Date of Patent: Jun. 20, 2023

(54) INFORMATION PROCESSING DEVICE AND INFORMATION PROCESSING METHOD FOR PREFETCHING ACROSS PAGE BOUNDARIES

(71) Applicant: FUJITSU LIMITED, Kawasaki (JP)

(72) Inventors: Shiho Nakahara, Nerima (JP); Takahide Yoshikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/571,578

(22) Filed: Jan. 10, 2022

(65) Prior Publication Data
US 2022/0318146 A1 Oct. 6, 2022

(30) Foreign Application Priority Data

Apr. 5, 2021 (JP) .............................. JP2021-064079

(51) Int. Cl.
*G06F 12/08* (2016.01)
*G06F 12/0862* (2016.01)
*G06F 9/30* (2018.01)

(52) U.S. Cl.
CPC ........ *G06F 12/0862* (2013.01); *G06F 9/3001* (2013.01); *G06F 2212/602* (2013.01)

(58) Field of Classification Search
None
See application file for complete search history.

(56) References Cited

U.S. PATENT DOCUMENTS

| | | | |
|---|---|---|---|
| 2002/0073282 A1 | 6/2002 | Chauvel et al. | |
| 2004/0003179 A1 | 1/2004 | Shirahige et al. | |
| 2006/0248279 A1* | 11/2006 | Al-Sukhni | G06F 12/0862 711/111 |
| 2014/0149632 A1* | 5/2014 | Kannan | G06F 12/0862 711/3 |
| 2014/0149679 A1* | 5/2014 | Rowlands | G06F 12/0862 711/137 |

(Continued)

FOREIGN PATENT DOCUMENTS

JP H06-259329 A 9/1994
JP 2004-038345 A 2/2004

*Primary Examiner* — Tracy C Chan
(74) *Attorney, Agent, or Firm* — Fujitsu Patent Center

(57) ABSTRACT

A device including: a processor executing a program; a first cache memory; a second cache memory belonging to a memory hierarchy lower than that of the first cache memory; a determination unit that determines, based on first information indicating a virtual address of information accessed in the second cache memory when the program is executed, second information indicating a virtual address of target information to be prefetched; and a prefetch unit that prefetches the target information and stores the prefetched target information in the second cache memory, wherein the second cache memory includes a conversion unit that converts, by using correspondence information indicating a correspondence relationship between the physical address of the target information and the virtual address of the target information, the second information into third information indicating a physical address of the target information, and the prefetch unit prefetches the target information using the third information.

7 Claims, 22 Drawing Sheets

(56) References Cited

U.S. PATENT DOCUMENTS

| | | | |
|---|---|---|---|
| 2014/0258622 A1* | 9/2014 | Lacourba | G06F 9/3832 711/137 |
| 2015/0026414 A1* | 1/2015 | Kalamatianos | G06F 12/06 711/137 |
| 2016/0055088 A1* | 2/2016 | Zhang | G06F 12/0862 711/137 |

* cited by examiner

FIG. 6

| ENTRY NUMBER | Valid | VIRTUAL PAGE NUMBER | PHYSICAL PAGE NUMBER |
|---|---|---|---|
| 1 | 1 | 0x7FDFF | 0x0020 |
| 2 | 1 | 0x00001 | 0x7FDC |
| 3 | 0 | | |

FIG. 8

| CYCLE COUNT | VIRTUAL ADDRESS INFORMATION | IDENTIFICATION INFORMATION |
|---|---|---|
| 0x01001222 | 0x00FFAB | 0x1 |
| 0x01001224 | 0x00FFAB | 0x2 |

FIG. 10

| ENTRY NUMBER | Valid | VIRTUAL PAGE NUMBER | PHYSICAL PAGE NUMBER |

INFORMATION PROCESSING DEVICE AND INFORMATION PROCESSING METHOD FOR PREFETCHING ACROSS PAGE BOUNDARIES

CROSS-REFERENCE TO RELATED APPLICATION

This application is based upon and claims the benefit of priority of the prior Japanese Patent Application No. 2021-64079, filed on Apr. 5, 2021, the entire contents of which are incorporated herein by reference.

FIELD

The embodiment discussed herein is related to information processing.

BACKGROUND

In recent information processing devices (computers), a cache memory is often provided together with a central processing unit (CPU) in an arithmetic processing unit. Information stored in the cache memory is commands to be executed by the CPU or data to be used to execute the commands.

When information to be used for command processing of the CPU exists in the cache memory and reading of the information from the cache memory succeeds, it is called a cache hit. On the other hand, when the information to be used for the command processing does not exist in the cache memory and reading of the information from the cache memory fails, it is called a cache miss.

Prefetching is performed to reduce cache misses and to improve the performance of the cache memory. Prefetching is a technique that predicts information to be accessed in the cache memory and reads the information into the cache memory before it is actually accessed.

In relation to the prefetching, there have been known a technique of performing prefetching across page boundaries in a processor having a plurality of layers of cache and a microprocessor having a shared cache. There has also been known a prefetch control device that implements prefetching on the basis of highly accurate prediction. There has also been known an information processing device having an address translation mechanism.

Examples of the related art include as follows: U.S. Patent Application Publication No. 2014/0149632; U.S. Patent Application Publication No. 2002/0073282; Japanese Laid-open Patent Publication No. 2004-38345; and Japanese Laid-open Patent Publication No. 06-259329.

SUMMARY

According to an aspect of the embodiments, there is provided an information processing device including an arithmetic processing unit, the arithmetic processing unit including: a processor that executes a program; a first cache memory; a second cache memory that belongs to a memory hierarchy lower than a memory hierarchy of the first cache memory; a determination unit that determines, on a basis of first information that indicates a virtual address of information accessed in the second cache memory when the program is executed, second information that indicates a virtual address of target information to be prefetched; and a prefetch unit that prefetches the target information and stores the prefetched target information in the second cache memory, wherein the second cache memory includes a conversion unit that converts, by using correspondence information that indicates a correspondence relationship between the physical address of the target information and the virtual address of the target information, the second information into third information that indicates a physical address of the target information, and the prefetch unit prefetches the target information using the third information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating a conversion table;

FIG. 8 is a diagram illustrating log information;

FIG. 10 is a diagram illustrating update information;

DESCRIPTION OF EMBODIMENTS

In today's information processing devices, a secondary cache memory is often provided together with a primary cache memory. Since the secondary cache memory does not retain information regarding a virtual page number, it is difficult to perform prefetching across virtual pages. The primary cache memory is sometimes referred to as a level 1

(L1) cache, and the secondary cache memory is sometimes referred to as a level 2 (L2) cache.

According to the technique of U.S. Patent Application Publication No. 2014/0149632, in a case where a prefetch stream has reached a predetermined position in the current page, an L1 prefetch unit requests an L1 translation lookaside buffer (TLB) to convert the next page, obtains a physical page number of the next page, and transmits it to an L2 prefetch unit. In a case where the prefetching has reached the end of the current page, the L2 prefetch unit continues the prefetching for the prefetch stream using the physical page number of the next page.

However, the operation of transmitting the physical page number of the next page from the L1 prefetch unit to the L2 prefetch unit brings pressure on a communication band between the L1 prefetch unit and the L2 prefetch unit. Furthermore, the prefetching of the L2 prefetch unit may reach the end of the current page before the L2 prefetch unit receives the physical page number of the next page. In this case, the accuracy in the prefetching by the L2 prefetch unit is lowered.

In hardware prefetching, information to be accessed in the future may be predicted by using the history of addresses accessed in the cache memory. However, since continuity of addresses is broken in access across pages, the history of addresses available is shortened, thereby lowering prediction accuracy.

Note that such a problem occurs not only in the secondary cache memory but also in the primary cache memory or a cache memory belonging to a memory hierarchy lower than that of the secondary cache memory.

In one aspect, the embodiment aims to improve accuracy in prefetching in a cache memory.

Hereinafter, an embodiment will be described in detail with reference to the drawings.

Figure 1:
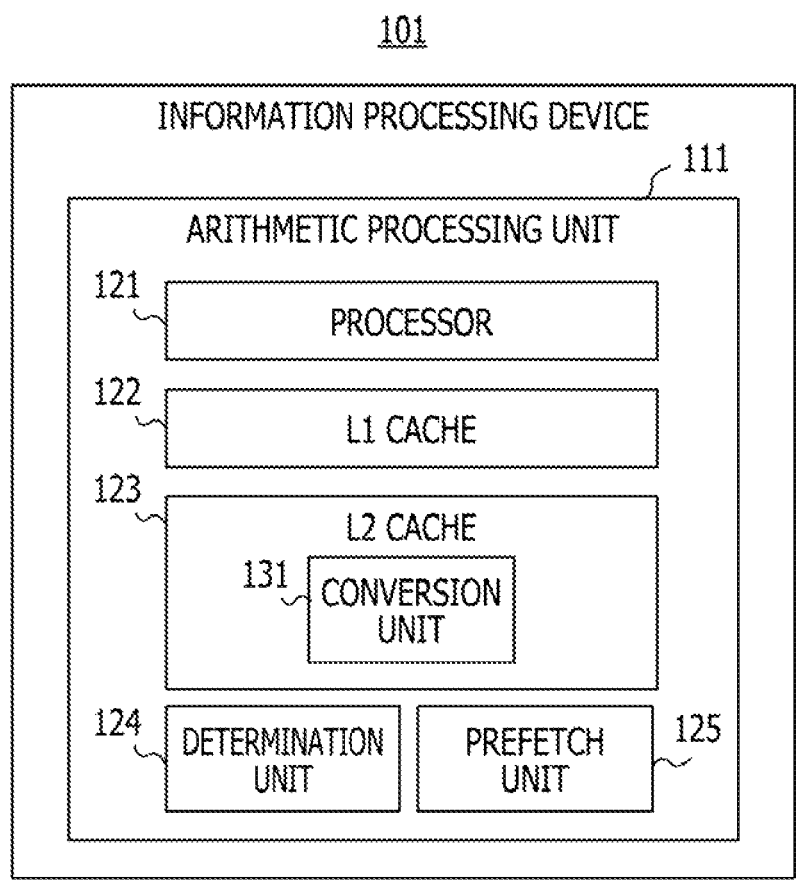
FIG. 1 is a configuration diagram of an information processing device.

FIG. 1 illustrates an exemplary configuration of an information processing device according to an embodiment. An information processing device 101 of FIG. 1 includes an arithmetic processing unit 111. The arithmetic processing unit 111 includes a processor 121, an L1 cache 122, an L2 cache 123, a determination unit 124, and a prefetch unit 125. The L2 cache 123 belongs to a memory hierarchy lower than that of the L1 cache 122, and includes a conversion unit 131.

Figure 2:
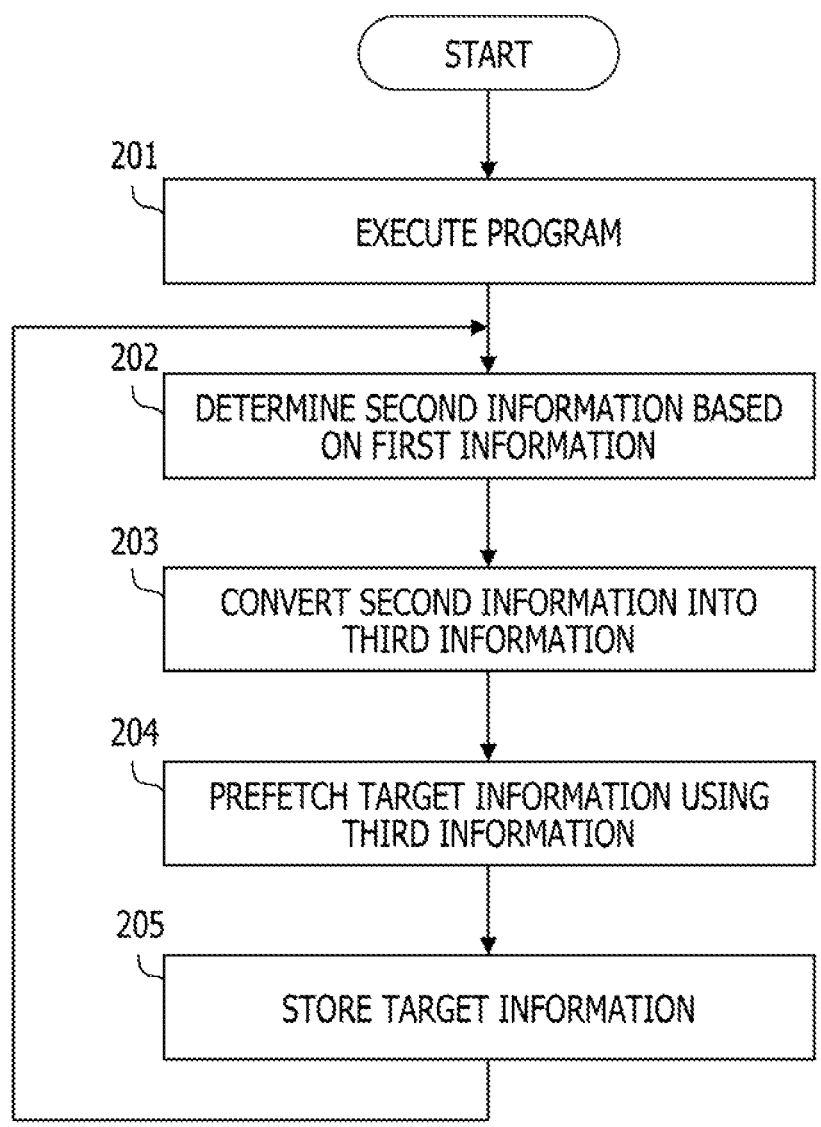
FIG. 2 is a flowchart of prefetching.

FIG. 2 is a flowchart illustrating exemplary prefetching performed by the information processing device 101 of FIG. 1. First, the processor 121 executes a program (step 201). Next, the determination unit 124 determines second information indicating a virtual address of target information to be prefetched on the basis of first information indicating a virtual address of information accessed in the second cache memory (step 202).

Next, the conversion unit 131 converts the second information into third information indicating a physical address of the target information using correspondence information indicating a correspondence relationship between the physical address of the target information and the virtual address of the target information (step 203). Then, the prefetch unit 125 prefetches the target information using the third information (step 204), and stores the prefetched target information in the L2 cache 123 (step 205).

The information processing device 101 repeats the process from steps 202 to 205 according to the information accessed in the second cache memory.

According to the information processing device 101 of FIG. 1, it becomes possible to improve the accuracy in the prefetching in the cache memory.

Figure 3:
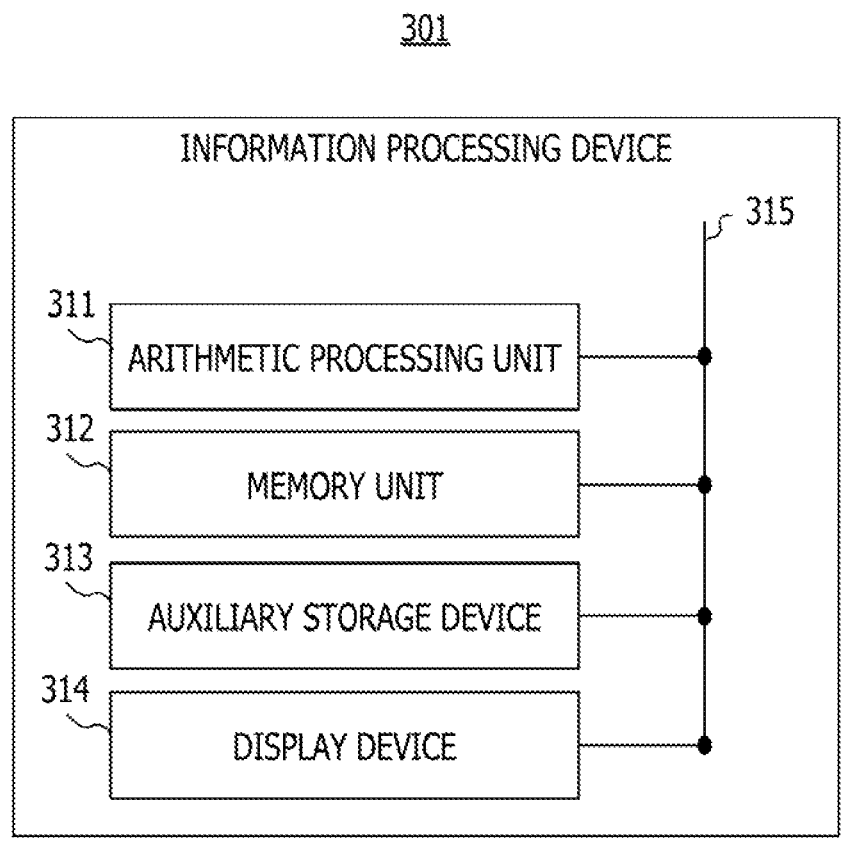
FIG. 3 is a hardware configuration diagram of the information processing device.

FIG. 3 is a hardware configuration diagram of the information processing device 101 of FIG. 1. An information processing device 301 of FIG. 3 includes an arithmetic processing unit 311, a memory unit 312, an auxiliary storage device 313, and a display device 314. Those constituent elements are hardware, and are coupled to one another by a bus 315. The arithmetic processing unit 311 corresponds to the arithmetic processing unit 111 in FIG. 1.

The memory unit 312 is a semiconductor memory such as a random access memory (RAM), and stores a program and data. The memory unit 312 may be called a main storage device. The arithmetic processing unit 311 executes a program using the data stored in the memory unit 312.

The auxiliary storage device 313 is, for example, a magnetic disk device, an optical disk device, a magneto-optical disk device, a tape device, or the like. The auxiliary storage device 313 may be a hard disk drive. The information processing device 301 is capable of storing programs and data in the auxiliary storage device 313 and loading them into the memory unit 312 for use. The display device 314 displays an inquiry or instruction to a user and a processing result on a screen.

Figure 4:
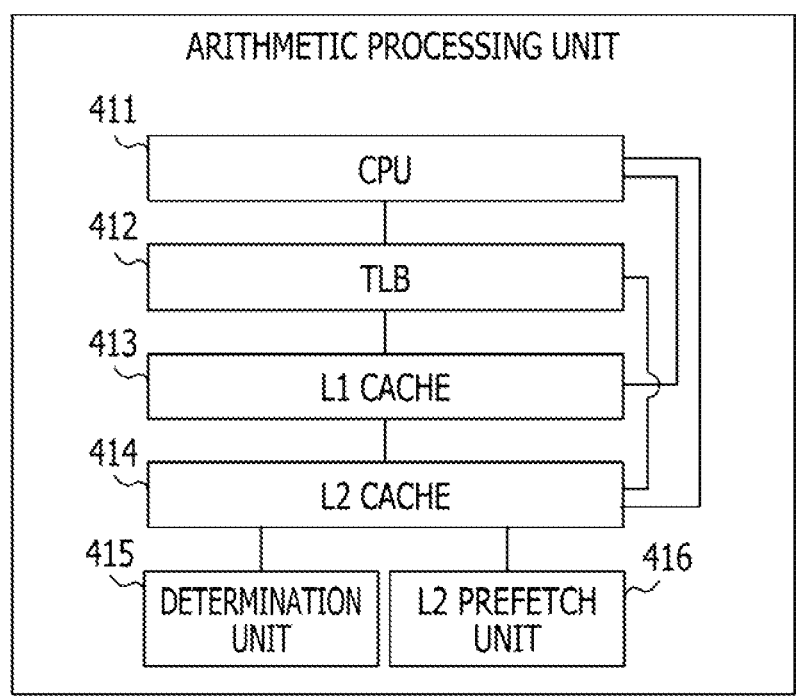
FIG. 4 is a first hardware configuration diagram of an arithmetic processing unit.

FIG. 4 illustrates an exemplary first hardware configuration of the arithmetic processing unit 311 in FIG. 3. The arithmetic processing unit 311 of FIG. 4 includes a CPU 411, a translation lookaside buffer (TLB) 412, an L1 cache 413, an L2 cache 414, a determination unit 415, and an L2 prefetch unit 416. Those constituent elements are hardware.

The CPU 411, the L1 cache 413, and the L2 cache 414 correspond to the processor 121, the L1 cache 122, and the L2 cache 123 in FIG. 1, respectively. The determination unit 415 and the L2 prefetch unit 416 correspond to the determination unit 124 and the prefetch unit 125 in FIG. 1, respectively.

The TLB 412 retains correspondence information indicating a correspondence relationship between a physical address and a virtual address of each of a plurality of pieces of data. In a case where the TLB 412 receives a virtual address from the CPU 411, it converts the received virtual address into a corresponding physical address using the correspondence information, and transmits it to the L1 cache 413.

The L1 cache 413 is a primary cache memory, and the L2 cache 414 is a secondary cache memory. The L2 cache 414 belongs to a memory hierarchy lower than that of the L1 cache 413. Therefore, the L2 cache 414 has an access speed slower than that of the L1 cache 413, and has capacity larger than that of the L1 cache 413.

The following events may occur in the arithmetic processing unit 311 at the time of executing the program.

Fetch (L2→L1)
Fetch (Main→L2)
Prefetch (L2→L1)
Prefetch (Main→L2)
Replacement
Invalidation
Write (L1→L2)
Write (L2→Main)

The fetch (L2→L1) represents an operation in which the L2 cache 414 transmits data to the L1 cache 413 and the L1 cache 413 receives the data from the L2 cache 414. The fetch (main→L2) represents an operation in which the memory unit 312 transmits data to the L2 cache 414 and the L2 cache 414 receives the data from the memory unit 312.

The prefetch (L2→L1) represents an operation in which the L1 cache 413 prefetches data from the L2 cache 414, and the prefetch (main→L2) represents an operation in which the L2 cache 414 prefetches data from the memory unit 312. The fetch (L2→L1), the fetch (main→L2), the prefetch (L2→L1), and the prefetch (main→L2) correspond to data read.

The replacement represents an operation of deleting data by replacing a cache line, and the invalidation represents an operation of invalidating a cache line. The replacement and the invalidation correspond to data deletion.

The write (L1→L2) represents an operation in which the L1 cache 413 transmits data to the L2 cache 414 and the L2 cache 414 receives the data from the L1 cache 413. The write (L2→main) represents an operation in which the L2 cache 414 transmits data to the memory unit 312 and the memory unit 312 receives the data from the L2 cache 414. The write (L1→L2) and the write (L2→main) correspond to data write.

A packet is transmitted and received between the L1 cache 413 and the L2 cache 414, or between the L2 cache 414 and the memory unit 312, depending on an event that has occurred. The transmitted/received packet includes, for example, event information indicating an event that has occurred, target data that is the target of the event, and a physical address of the target data.

The CPU 411 transmits an access request to the TLB 412 when accessing data stored in the memory unit 312 at the time of program execution. The access request is, for example, a read request or a write request, and includes a virtual address of data to be accessed. The TLB 412 converts the virtual address included in the access request into a corresponding physical address, and transmits it to the L1 cache 413.

In a case where the access request is a read request and a cache hit has occurred in the L1 cache 413, the L1 cache 413 transmits the requested data to the CPU 411. Meanwhile, in a case where a cache miss has occurred in the L1 cache 413, the L1 cache 413 transmits a packet including a physical address of the requested data to the L2 cache 414.

In a case where a cache hit has occurred in the L2 cache 414, the L2 cache 414 transmits a fetch (L2→L1) packet to the L1 cache 413. The fetch (L2→L1) packet includes event information indicating the fetch (L2→L1), data to be a target of the fetch (L2→L1), and a physical address of the data. The data to be a target of the fetch (L2→L1) is data in which a cache hit has occurred.

The L1 cache 413 stores the data included in the received fetch (L2→L1) packet, and transmits the data to the CPU 411.

Meanwhile, in a case where a cache miss has occurred in the L2 cache 414, the L2 cache 414 transmits a packet including a physical address of the requested data to the memory unit 312.

The memory unit 312 extracts the data stored in the physical address included in the received packet, and transmits a fetch (main→L2) packet to the L2 cache 414. The fetch (main→L2) packet includes event information indicating the fetch (main→L2), data to be a target of the fetch (main→L2), and a physical address of the data. The data to be a target of the fetch (main→L2) is the data extracted from the memory unit 312.

The L2 cache 414 stores the data included in the received packet, and transmits the fetch (L2→L1) packet to the L1 cache 413. The fetch (L2→L1) packet includes event information indicating the fetch (L2→L1), data to be a target of the fetch (L2→L1), and a physical address of the data. The data to be a target of the fetch (L2→L1) is the data included in the packet received from the memory unit 312.

The L1 cache 413 stores the data included in the received fetch (L2→L1) packet, and transmits the data to the CPU 411.

Figure 5:
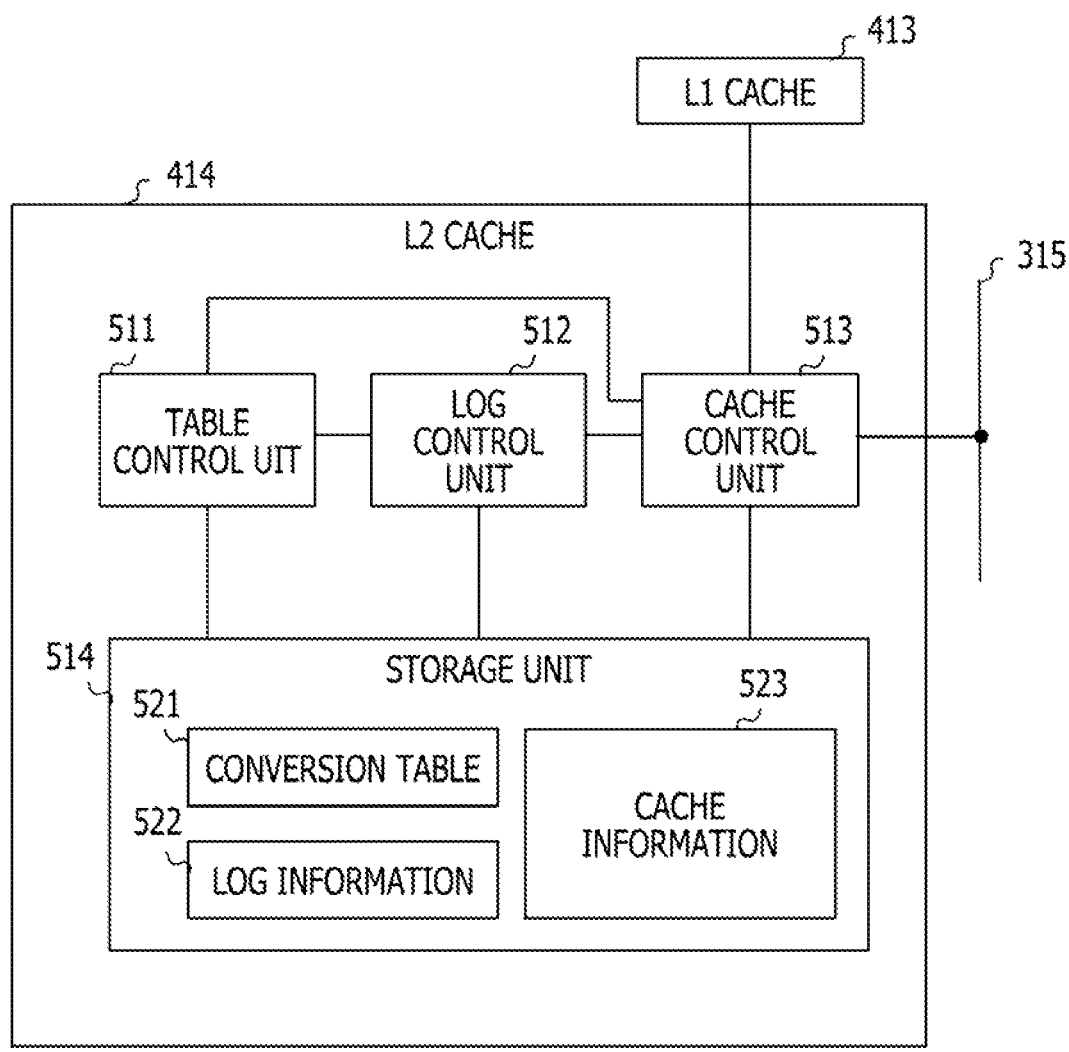
FIG. 5 is a hardware configuration diagram of an L2 cache.

FIG. 5 illustrates an exemplary hardware configuration of the L2 cache 414 in FIG. 4. The L2 cache 414 of FIG. 5 includes a table control unit 511, a log control unit 512, a cache control unit 513, and a storage unit 514. Those constituent elements are hardware circuits. The storage unit 514 may be a memory array. The table control unit 511 corresponds to the conversion unit 131 in FIG. 1.

The storage unit 514 stores a conversion table 521 and cache information 523. The conversion table 521 includes correspondence information same as the correspondence information retained by the TLB 412.

FIG. 6 illustrates an example of the conversion table 521 in FIG. 5. Each entry of the conversion table 521 of FIG. 6 includes an entry number, Valid, a virtual page number, and a physical page number. The correspondence information retained by the TLB 412 also includes entries similar to those of FIG. 6.

The entry number is identification information of an entry, and the Valid indicates whether the entry is valid or invalid. The entry is valid in a case where the Valid is logic "1", and the entry is invalid in a case where the Valid is logic The virtual page number is a page number included in a virtual address, and the physical page number is a page number included in a physical address. In this example, the virtual page number and the physical page number are indicated in hexadecimal numbers. The physical page number in each entry corresponds to the virtual page number in the same entry. Therefore, the conversion table 521 indicates a correspondence relationship between the physical address and the virtual address of each piece of data.

Figure 7:
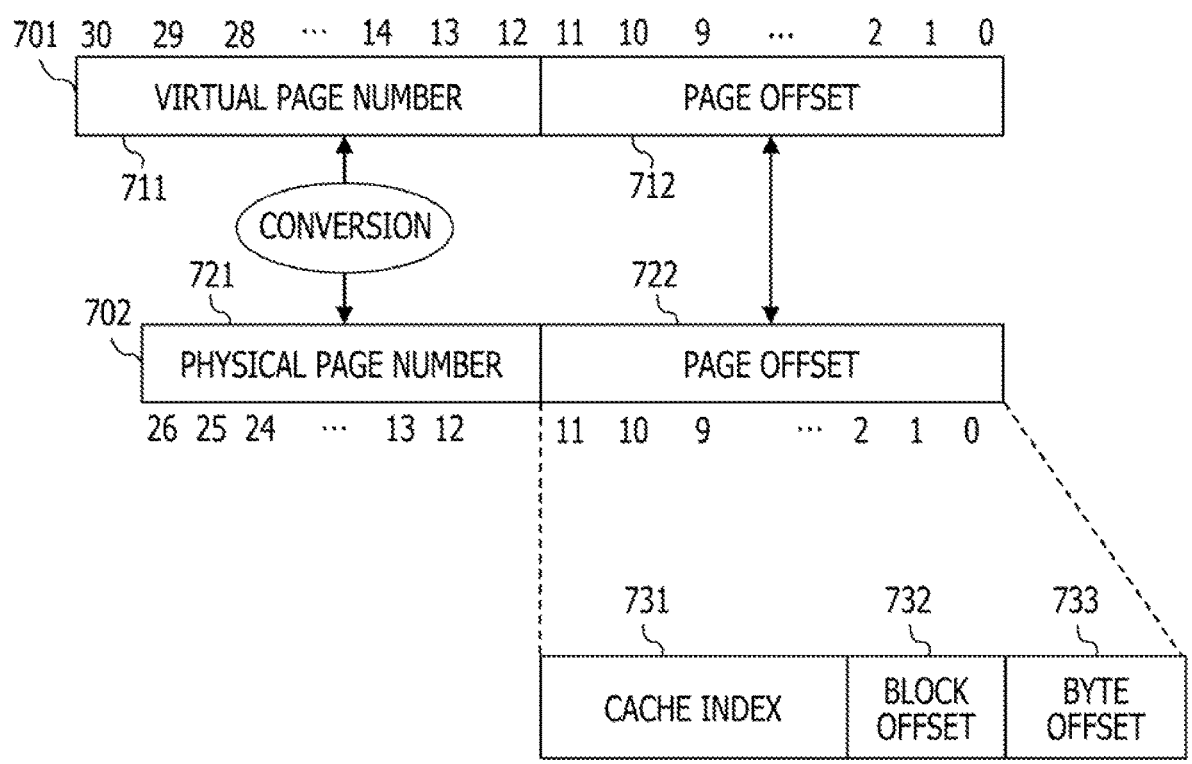
FIG. 7 is a diagram illustrating a virtual address and a physical address.

FIG. 7 illustrates an exemplary virtual address and physical address. A size of a virtual memory space is 2 GB, and a size of a physical memory space is 128 MB. The virtual memory space and the physical memory space are divided into pages of 4 KB.

A virtual address 701 in FIG. 7 represents a 31-bit address in the virtual memory space, and includes a 19-bit virtual page number 711 and a 12-bit page offset 712. A physical address 702 corresponds to the virtual address 701, and represents a 27-bit address in the physical memory space. The physical address 702 includes a 15-bit physical page number 721 and a 12-bit page offset 722.

Contents of the page offset 722 are the same as contents of the page offset 712, and include a cache index 731, a block offset 732, and a byte offset 733. The cache index 731 is information indicating a cache line, the block offset 732 is information indicating a position of a word in the cache line, and the byte offset 733 is information indicating a position of a byte in the word.

Since the contents of the page offset 712 and the page offset 722 are the same, it becomes possible to perform conversion between the virtual address and the physical address only by recording the virtual page number 711 and the physical page number 721 in association with each other in the conversion table 521.

The cache information 523 includes a plurality of cache lines, and each of the cache lines includes data received by the L2 cache 414 from the L1 cache 413 or from the memory unit 312. The data included in each of the cache lines corresponds to a page or a block.

The cache control unit 513 is connected to the L1 cache 413, and is capable of transmitting/receiving a packet to/from the L1 cache 413. The cache control unit 513 is also connected to the bus 315, and is capable of transmitting/receiving a packet to/from the memory unit 312.

In a case where a packet including a physical address of data is received from the L1 cache 413 and a cache hit occurs, the cache control unit 513 extracts data corresponding to the physical address included in the received packet from the cache information 523. Then, the cache control unit 513 transmits the fetch (L2→L1) packet including the extracted data to the L1 cache 413 and to the log control unit 512.

Meanwhile, in a case where a cache miss occurs, the cache control unit 513 transmits the packet including a physical address of requested data to the memory unit 312, and receives a fetch (main→L2) packet from the memory unit 312.

Next, the cache control unit 513 records the data included in the fetch (main→L2) packet in the cache information 523, and transmits the packet to the log control unit 512. Then, the cache control unit 513 transmits the fetch (L2→L1) packet including the data recorded in the cache information 523 to the L1 cache 413 and to the log control unit 512.

The table control unit 511 refers to or updates the conversion table 521 in response to a request from the log control unit 512 or from the cache control unit 513.

The log control unit 512 requests the table control unit 511 to convert the physical address included in the packet received from the cache control unit 513. The table control unit 511 converts the physical address into a virtual address using the conversion table 521, and outputs the virtual address to the log control unit 512. At this time, the table control unit 511 converts the physical page number included in the physical address into a virtual page number using the conversion table 521, and connects the virtual page number with the page offset included in the physical address, thereby generating the virtual address.

The log control unit 512 removes a block offset and a byte offset from the virtual address output from the table control unit 511, thereby generating virtual address information including the virtual page number and a cache index. Then, the log control unit 512 generates an entry of log information 522 using the virtual address information, and stores it in the storage unit 514.

FIG. 8 illustrates an example of the log information 522 in FIG. 5. Each entry of the log information 522 of FIG. 8 includes a cycle count, virtual address information, and identification information. The cycle count is information indicating time at which an event has occurred, and the virtual address information includes a virtual page number and a cache index. In this example, the cycle count and the virtual address information are indicated in hexadecimal numbers. The identification information is identification information of an event corresponding to event information included in a received packet.

When a virtual page number and a cache index are known, it is possible to specify a cache line in which data indicated by a virtual address is stored, and thus a block offset and a byte offset are excluded from the virtual address information. For example, the following values may be used as the identification information.

0x1 fetch (L2→L1)
0x2 fetch (main→L2)
0x3 prefetch (L2→L1)
0x4 prefetch (main→L2)
0x5 replacement
0x6 invalidation
0x7 write (L1→L2)
0x8 write (L2→main)

Note that, another piece of information may be added to the entries of the log information 522. The another piece of information is physical address information corresponding to the virtual address information, data to be a target of an event, a value of a program counter when an event has occurred, or the like. In a case where the physical address information is added, the log control unit 512 generates physical address information by removing a block offset and a byte offset from a physical address included in a packet received from the cache control unit 513. The physical address information includes a physical page number and a cache index.

The information processing device 301 operates in any one of operation modes including a normal mode, a cache monitor mode, and a log acquisition mode. In the cache monitor mode, the information processing device 301 monitors input/output of data in the L2 cache 414, and generates an entry of the log information 522 when an event has occurred.

In the log acquisition mode, the information processing device 301 obtains the log information 522 from the storage unit 514. In the normal mode, the information processing device 301 performs information processing without generating or obtaining the log information 522.

Figure 9:
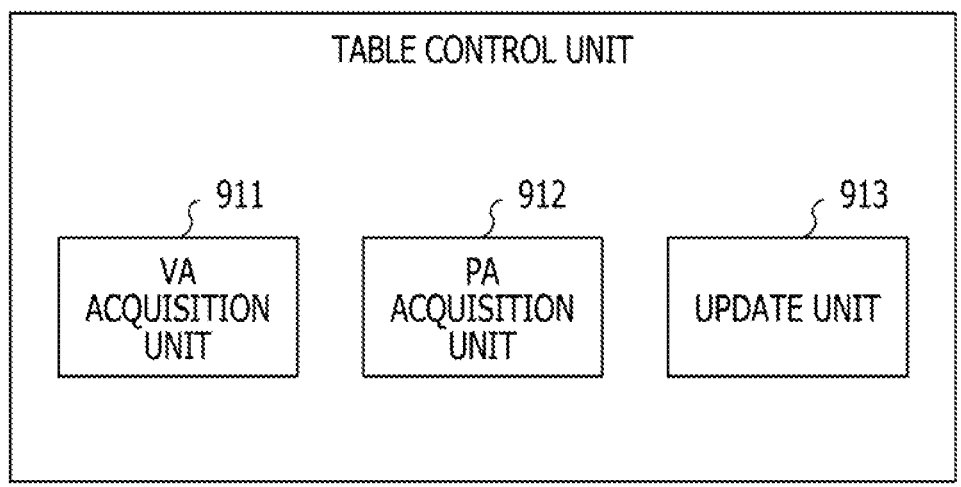
FIG. 9 is a hardware configuration diagram of a table control unit.

FIG. 9 illustrates an exemplary hardware configuration of the table control unit 511 in FIG. 5. The table control unit 511 of FIG. 9 includes a virtual address (VA) acquisition unit 911, a physical address (PA) acquisition unit 912, and an update unit 913. Those constituent elements are hardware circuits.

In a case where a physical address is input from the log control unit 512, the VA acquisition unit 911 refers to an entry including a physical page number in the input physical address in the conversion table 521. Then, the VA acquisition unit 911 obtains a virtual page number from the entry, generates a virtual address including the obtained virtual page number, and outputs it to the log control unit 512.

In a case where a physical page number is input from the determination unit 415, the VA acquisition unit 911 refers to an entry including the input physical page number in the conversion table 521. Then, the VA acquisition unit 911 obtains a virtual page number from the entry, and outputs the obtained virtual page number to the determination unit 415.

In a case where a virtual page number is input from the determination unit 415, the PA acquisition unit 912 refers to an entry including the input virtual page number in the conversion table 521. Then, the PA acquisition unit 912 obtains a physical page number from the entry, and outputs the obtained physical page number to the determination unit 415.

In a case where the update unit 913 receives update information indicating update of correspondence information in the TLB 412, it updates the conversion table 521 on the basis of the received update information, thereby reflecting the update in the TLB 412 in the conversion table 521. With this arrangement, it becomes possible to synchronize the conversion table 521 with the correspondence information in the TLB 412.

FIG. 10 illustrates an example of the update information. The update information of FIG. 10 is a packet, and includes an entry number, Valid, virtual page number, and physical page number of an updated entry among entries of the correspondence information retained by the TLB 412.

The TLB 412 transmits the packet of FIG. 10 to the L2 cache 414, and the cache control unit 513 transmits the received packet to the table control unit 511. The update unit 913 overwrites the information included in the packet on an entry having the same entry number in the conversion table 521, thereby updating the conversion table 521.

Figure 11:
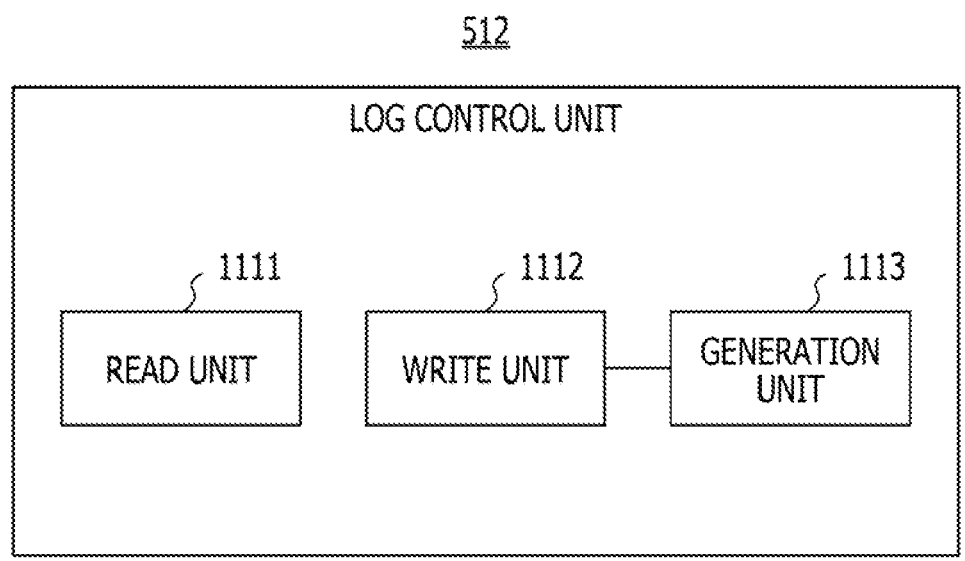
FIG. 11 is a hardware configuration diagram of a log control unit.

FIG. 11 illustrates an exemplary hardware configuration of the log control unit 512 in FIG. 5. The log control unit 512 of FIG. 11 includes a read unit 1111, a write unit 1112, and a generation unit 1113. Those constituent elements are hardware circuits.

The generation unit 1113 validates the cache monitor mode in a case of receiving validation signals from the CPU 411, and invalidates the cache monitor mode in a case of receiving invalidation signals from the CPU 411.

In a case where the cache monitor mode is validated, the generation unit 1113 requests the table control unit 511 to convert a physical address included in a packet received from the cache control unit 513. Then, the generation unit 1113 receives a virtual address corresponding to the physical address from the table control unit 511.

Next, the generation unit 1113 removes a block offset and a byte offset from the virtual address output from the table control unit 511 to generate virtual address information, and generates an entry of the log information 522 using the generated virtual address information. Then, the generation unit 1113 transmits the generated entry to the write unit 1112. The write unit 1112 writes the entry received from the generation unit 1113 to the log information 522.

In a case where the read unit 1111 receives a log request from the CPU 411, it reads out the log information 522 from the storage unit 514, and transmits it to the CPU 411.

The L2 prefetch unit 416 in FIG. 4 prefetches data from the memory unit 312, and stores the prefetched data in the L2 cache 414. At the start of streaming prefetching, the L2 prefetch unit 416 transmits the physical page number of the physical page that is the current prefetching target to the determination unit 415. The physical page that is the current prefetching target is a physical page including the data accessed by the CPU 411.

The determination unit 415 transmits the received physical page number to the table control unit 511 of the L2 cache 414, and requests conversion of the physical page number. The VA acquisition unit 911 of the table control unit 511 converts the received physical page number into a virtual page number using the conversion table 521, and transmits the virtual page number to the determination unit 415.

With this arrangement, the determination unit 415 is enabled to determine the next prefetching target on the basis of the virtual page number corresponding to the current prefetching target.

The determination unit 415 obtains a virtual page number corresponding to the next virtual page of the virtual page corresponding to the received virtual page number, and transmits the obtained virtual page number to the table control unit 511 of the L2 cache 414. The PA acquisition unit 912 of the table control unit 511 converts the received virtual page number into a physical page number using the conversion table 521, and transmits the physical page number to the determination unit 415.

The determination unit 415 transmits the received physical page number to the L2 prefetch unit 416, and the L2 prefetch unit 416 stores the received physical page number as a physical page number of the physical page to be the next prefetching target.

In a case where the position of the data to be prefetched reaches the end of the physical page that is the current prefetching target, the L2 prefetch unit 416 starts prefetching the data from the beginning of the physical page indicated by the stored physical page number. Then, the arithmetic processing unit 311 repeats the similar operation according to the data accessed by the CPU 411.

The data included in the physical page corresponding to the next virtual page is exemplary target information to be prefetched. The virtual page number of the current prefetching target transmitted from the VA acquisition unit 911 to the determination unit 415 is an example of the first information. The virtual page number of the next virtual page transmitted from the determination unit 415 to the table control unit 511 is an example of the second information.

The physical page number of the physical page corresponding to the next virtual page transmitted from the PA acquisition unit 912 to the determination unit 415 is an example of the third information. The physical page number of the current prefetching target transmitted from the L2 prefetch unit 416 to the determination unit 415 is an example of fourth information.

Figure 12:
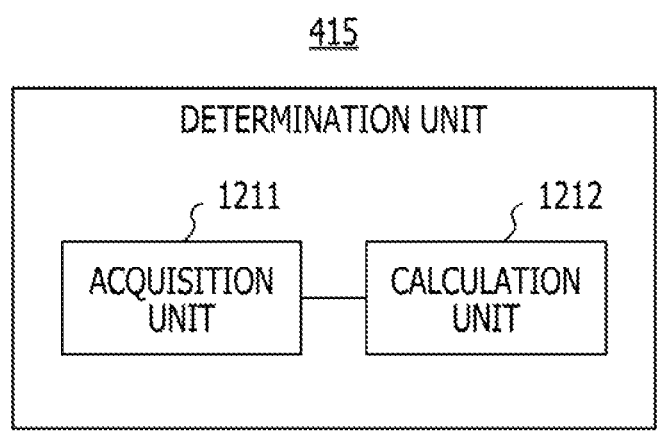
FIG. 12 is a hardware configuration diagram of a determination unit.

FIG. 12 illustrates an exemplary hardware configuration of the determination unit 415 in FIG. 4. The determination unit 415 of FIG. 12 includes an acquisition unit 1211 and a calculation unit 1212. Those constituent elements are hardware circuits.

The acquisition unit 1211 transmits the physical page number received from the L2 prefetch unit 416 to the table control unit 511 of the L2 cache 414. Then, the acquisition unit 1211 receives a corresponding virtual page number from the VA acquisition unit 911 of the table control unit 511, and outputs it to the calculation unit 1212.

The calculation unit 1212 calculates a virtual page number indicating the next virtual page of the virtual page indicated by the virtual page number output from the acquisition unit 1211, and transmits the calculated virtual page number to the table control unit 511 of the L2 cache 414. Then, the calculation unit 1212 receives a corresponding physical page number from the PA acquisition unit 912 of the table control unit 511, and transmits it to the L2 prefetch unit 416.

According to the arithmetic processing unit 311 in FIG. 4, in a case where the position of the data to be prefetched reaches the end of the physical page corresponding to the current virtual page in the L2 cache 414, prefetching of the physical page corresponding to the next virtual page starts. Therefore, it becomes possible to perform prefetching across virtual pages, thereby improving the accuracy in prefetching.

It is possible to perform prefetching across virtual pages in a similar manner also in another prefetching such as stride prefetching, not limited to streaming prefetching.

Figure 13:
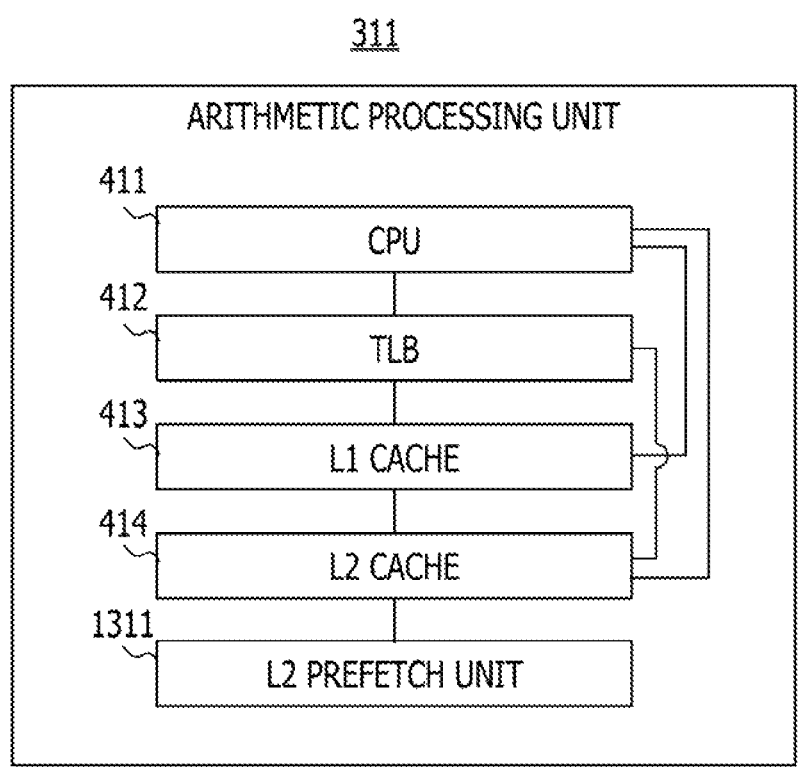
FIG. 13 is a second hardware configuration diagram of the arithmetic processing unit.

FIG. 13 illustrates an exemplary second hardware configuration of the arithmetic processing unit 311 in FIG. 3. The arithmetic processing unit 311 of FIG. 13 has a configuration in which the determination unit 415 and the L2 prefetch unit 416 are replaced with an L2 prefetch unit 1311 in the arithmetic processing unit 311 in FIG. 4. The L2 prefetch unit 1311 is hardware.

When an entry of the log information 522 is generated, the log control unit 512 of the L2 cache 414 stores the generated entry in the storage unit 514, and transmits it to the L2 prefetch unit 1311. The L2 prefetch unit 1311 prefetches data from the memory unit 312 using the entry received from the log control unit 512, and stores the prefetched data in the L2 cache 414.

Figure 14:
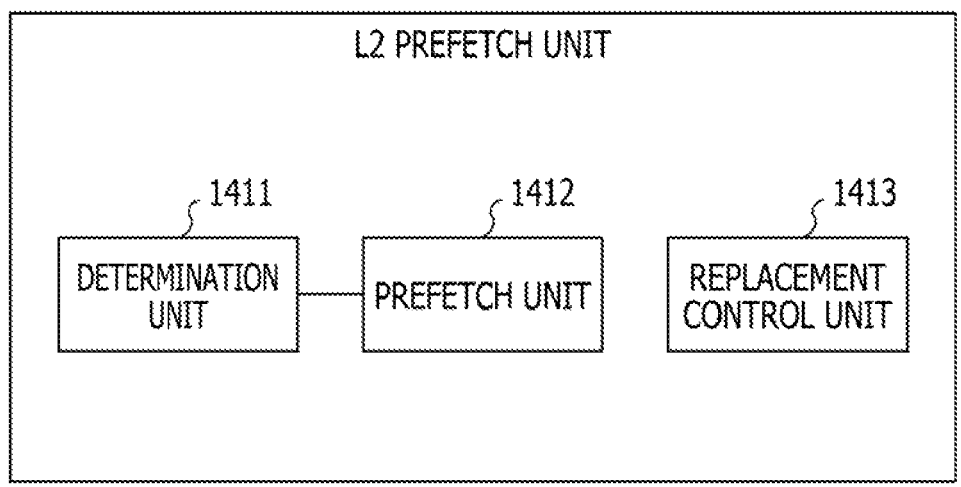
FIG. 14 is a hardware configuration diagram of an L2 prefetch unit.

FIG. 14 illustrates an exemplary hardware configuration of the L2 prefetch unit 1311 in FIG. 13. The L2 prefetch unit 1311 of FIG. 14 includes a determination unit 1411, a prefetch unit 1412, and a replacement control unit 1413. Those constituent elements are hardware circuits. The determination unit 1411 and the prefetch unit 1412 correspond to the determination unit 124 and the prefetch unit 125 in FIG. 1, respectively.

The determination unit 1411 determines virtual address information indicating the virtual address of the data to be prefetched using the entry of the log information 522 generated in the L2 cache 414, and outputs it to the prefetch unit 1412. The prefetch unit 1412 determines the physical address of the data to be prefetched on the basis of the virtual address information output from the determination unit 1411, and prefetches the data from the memory unit 312. The replacement control unit 1413 controls replacement of a cache line in the L2 cache 414.

Figure 15:
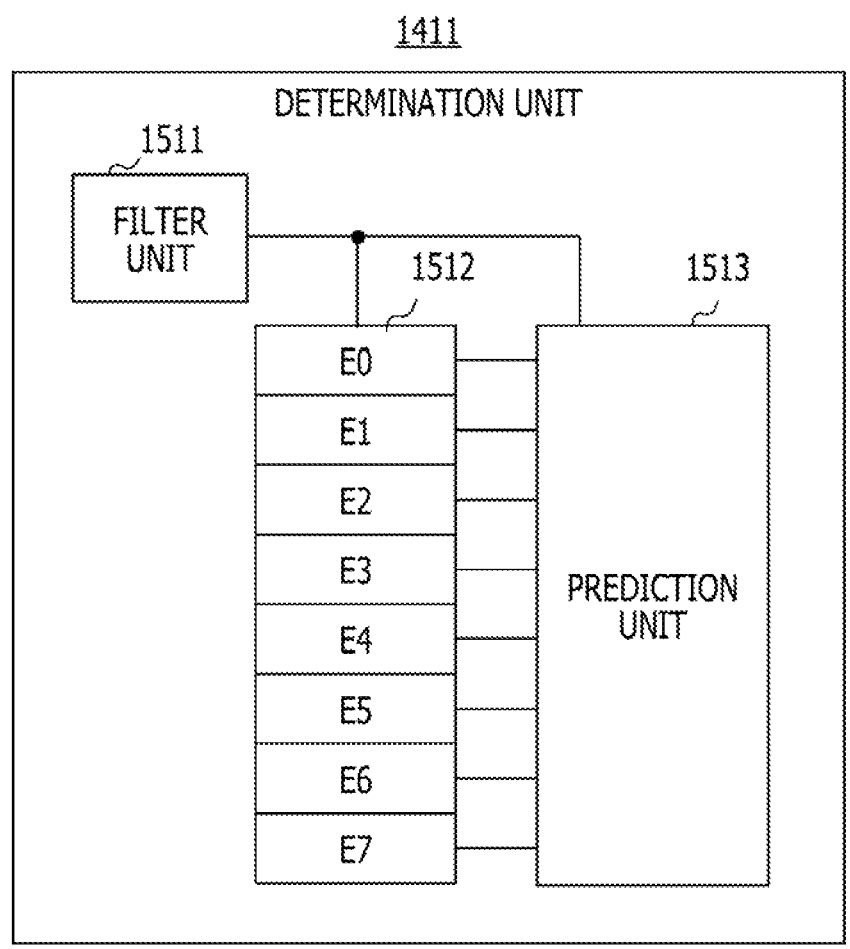
FIG. 15 is a hardware configuration diagram of the determination unit included in the L2 prefetch unit.

FIG. 15 illustrates an exemplary hardware configuration of the determination unit 1411 in FIG. 14. The determination unit 1411 of FIG. 15 includes a filter unit 1511, a storage unit 1512, and a prediction unit 1513, and determines a target of prefetching in stride prefetching. Those constituent elements are hardware circuits.

The filter unit 1511 receives an entry of the log information 522 from the log control unit 512, and in a case where the identification information of the received entry indicates fetch (L2→L1), it extracts virtual address information from the entry. Then, the filter unit 1511 outputs the extracted virtual address information to the storage unit 1512 and to the prediction unit 1513.

The storage unit 1512 includes entries E0 to E7, and stores the virtual address information output from the filter unit 1511 in a format of First-In First-Out (FIFO). When the entry E0 receives new virtual address information output from the filter unit 1511, it retains the received virtual address information, and outputs old virtual address information previously retained to the entry E1 and to the prediction unit 1513.

When an entry Ei (i=1 to 6) receives new virtual address information output from the entry E (i−1), it retains the received virtual address information, and outputs old virtual address information previously retained to the entry E (i+1) and to the prediction unit 1513. When the entry E7 receives new virtual address information output from the entry E6, it retains the received virtual address information, and outputs old virtual address information previously retained to the prediction unit 1513.

The virtual address information stored in the entries E0 to E7 is access history information indicating the virtual address of the data accessed by the CPU 411.

The prediction unit 1513 searches for an arithmetic progression pattern by pattern matching from time-series virtual address information including the virtual address information output from the entries E0 to E7 and the virtual address information output from the filter unit 1511.

In a case where an arithmetic progression pattern is found from the time-series virtual address information, the prediction unit 1513 predicts a virtual address information of the data to be prefetched using the found pattern. Specifically, for example, the prediction unit 1513 adds the intersection of the found arithmetic progression to the virtual address information of the last accessed data, thereby obtaining virtual address information of the data to be prefetched. Then, the prediction unit 1513 outputs the predicted virtual address information to the prefetch unit 1412.

The data to be prefetched is an example of target information to be prefetched. The virtual address information extracted from the entry of the log information 522 is an example of the first information. The virtual address information output from the prediction unit 1513 to the prefetch unit 1412 is an example of the second information.

Figure 16:
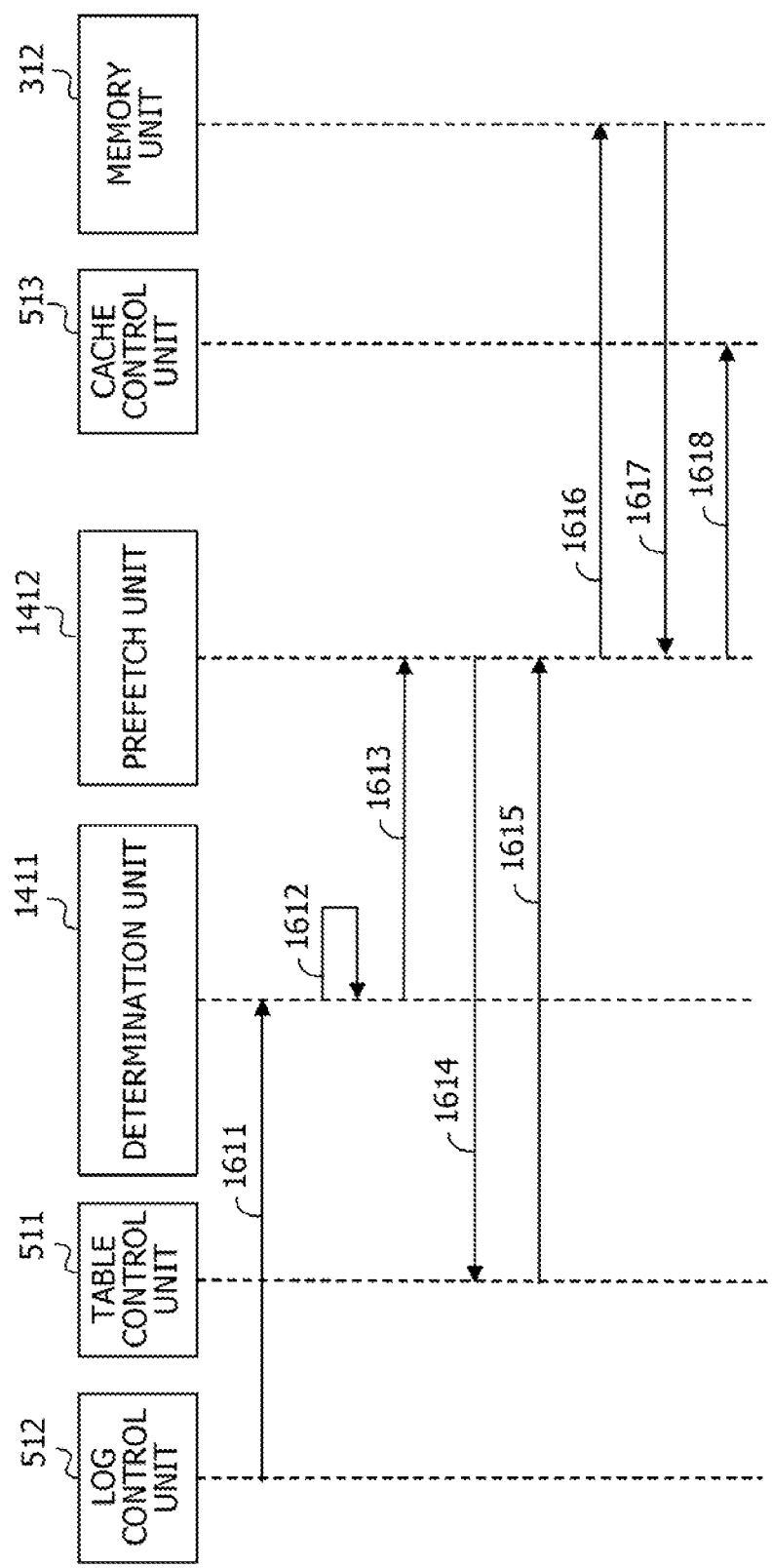
FIG. 16 is a diagram illustrating prefetching.

FIG. 16 illustrates exemplary prefetching performed by the L2 prefetch unit 1311 of FIG. 14. First, the log control unit 512 of the L2 cache 414 transmits an entry of the log information 522 to the determination unit 1411 of the L2 prefetch unit 1311 (step 1611).

The prediction unit 1513 of the determination unit 1411 predicts virtual address information of data to be prefetched using virtual address information of the received entry and virtual address information output from the storage unit 1512 (step 1612). Then, the prediction unit 1513 outputs the predicted virtual address information to the prefetch unit 1412 (step 1613).

The prefetch unit 1412 transmits the virtual address information output from the determination unit 1411 to the table control unit 511 of the L2 cache 414, and requests conversion of the virtual address information (step 1614).

The PA acquisition unit 912 of the table control unit 511 converts the virtual page number included in the received virtual address information into a physical page number using the conversion table 521. Then, the PA acquisition unit 912 concatenates the converted physical page number and a cache index included in the virtual address information to generate physical address information, and transmits it to the prefetch unit 1412 (step 1615). The physical address information transmitted from the PA acquisition unit 912 to the prefetch unit 1412 is an example of the third information.

The prefetch unit 1412 generates a prefetch request for prefetching data indicated by the received physical address, and transmits it to the memory unit 312 (step 1616).

The memory unit 312 transmits data indicated by the prefetch request to the prefetch unit 1412 (step 1617), and the prefetch unit 1412 transmits the data received from the memory unit 312 and the physical address of the data to the L2 cache 414 (step 1618). The cache control unit 513 of the L2 cache 414 records the data received from the prefetch unit 1412 in the cache information 523.

According to the determination unit 1411 of FIG. 15, access history information of data accessed by the CPU 411 is recorded using virtual address information, thereby maintaining continuity of virtual addresses. Therefore, it becomes possible to predict a target of prefetching on the basis of the virtual address, and the accuracy in hardware prefetching is improved.

Furthermore, since the entry of the log information 522 generated by the L2 cache 414 is used, it becomes possible to obtain access history information longer than in the case of not generating the log information 522. With the target of the prefetching predicted on the basis of the longer access history information, the prediction accuracy improves.

Figure 17:
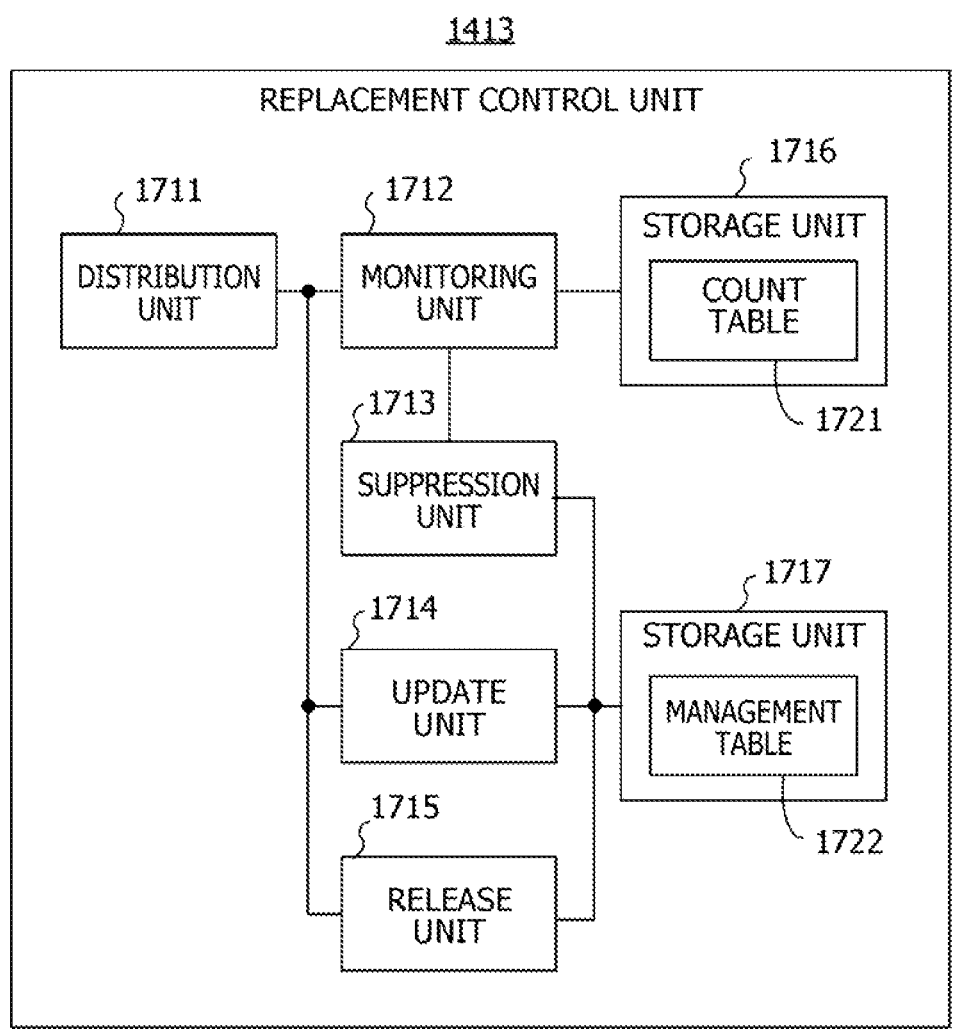
FIG. 17 is a hardware configuration diagram of a replacement control unit.

FIG. 17 illustrates an exemplary hardware configuration of the replacement control unit 1413 in FIG. 14. The replacement control unit 1413 of FIG. 17 includes a distribution unit 1711, a monitoring unit 1712, a suppression unit 1713, an update unit 1714, a release unit 1715, a storage unit 1716, and a storage unit 1717. Those constituent elements are hardware circuits. The storage unit 1716 stores a count table 1721, and the storage unit 1717 stores a management table 1722.

The distribution unit 1711 receives an entry of the log information 522 from the log control unit 512, and distributes the received entry to the monitoring unit 1712, the update unit 1714, and the release unit 1715. In this case, the entry of the log information 522 may include physical address information in addition to a cycle count, virtual address information, and identification information.

In a case where the identification information of the received entry indicates fetch (main→L2), the distribution unit 1711 outputs the entry to the monitoring unit 1712 and to the release unit 1715. In a case where the identification information of the received entry indicates fetch (L2→L1), the distribution unit 1711 outputs the entry to the update unit 1714.

The monitoring unit 1712 monitors the number of times the L2 cache 414 has received specific data from the memory unit 312. Specifically, for example, in a case where a fetch (main→L2) entry is output from the distribution unit 1711, the monitoring unit 1712 records the number of times the data indicated by the entry has been transmitted from the memory unit 312 to the L2 cache 414 in the count table 1721.

Each entry of the count table 1721 includes address information ADDR1, a count CNT, start time ST1, and final time LT1. The ADDR1 represents virtual address information or physical address information included in the entry output from the distribution unit 1711. The CNT represents the number of times fetch (main→L2) of the data indicated by the ADDR1 has occurred. The CNT is one when an entry is generated. The ST1 represents a cycle count when an entry is generated, and the LT1 represents a cycle count when the CNT is updated for the final time. The cycle count is information indicating time.

In a case where the CNT of any entry in the count table 1721 exceeds a predetermined number of times, the monitoring unit 1712 outputs the ADDR1 of the entry to the suppression unit 1713 as address information to be suppressed. The suppression unit 1713 instructs the L2 cache 414 to suppress replacement operation of replacing the data indicated by the address information to be suppressed with another piece of data.

The cache control unit 513 of the L2 cache 414 suppresses replacement of the cache line indicated by the address information to be suppressed among the cache lines included in the cache information 523 in accordance with the instruction from the suppression unit 1713. The cache control unit 513 suppresses the replacement operation by, for example, moving the cache line data indicated by the address information to be suppressed to a sector cache. The sector cache indicates an area that retains data not to be replaced.

With the monitoring unit 1712 and the suppression unit 1713 provided, replacement of data in which the number of times of transmission from the memory unit 312 to the L2 cache 414 exceeds a predetermined number of times is blocked, thereby reducing cache misses in the L2 cache 414.

When the address information to be suppressed is output from the monitoring unit 1712, the suppression unit 1713 generates an entry of the management table 1722 corresponding to the address information.

Each entry in the management table 1722 includes address information ADDR2, start time ST2, final time LT2, and a wait time WT. The address information to be suppressed output from the monitoring unit 1712 is recorded as the ADDR2. The ST2 represents a cycle count when an entry is generated, and the LT2 represents a cycle count when data fetch (L2→L1) indicated by the ADDR2 is generated for the final time. The WT represents a wait time from the LT2 until the suppression of the replacement operation is released.

In a case where a fetch (L2→L1) entry is output from the distribution unit 1711, the update unit 1714 changes the LT2 of the corresponding entry in the management table 1722 to the current cycle count, thereby updating the entry.

In a case where a fetch (main→L2) entry is output from the distribution unit 1711, the release unit 1715 checks the LT2 of each entry in the management table 1722. Then, in a case where data indicated by any entry has not been transmitted from the L2 cache 414 to the L1 cache 413 for a certain period of time, the release unit 1715 instructs the L2 cache 414 to release the suppression of the replacement operation for the data indicated by the entry. The WT included in the entry is used as the certain period of time.

The cache control unit 513 of the L2 cache 414 releases the suppression of the replacement operation for the instructed data in accordance with the instruction from the release unit 1715.

With the release unit 1715 provided, replacement of data that has not been transmitted from the L2 cache 414 to the L1 cache 413 for a certain period of time is promoted, thereby improving the performance of the L2 cache 414.

Figure 18:
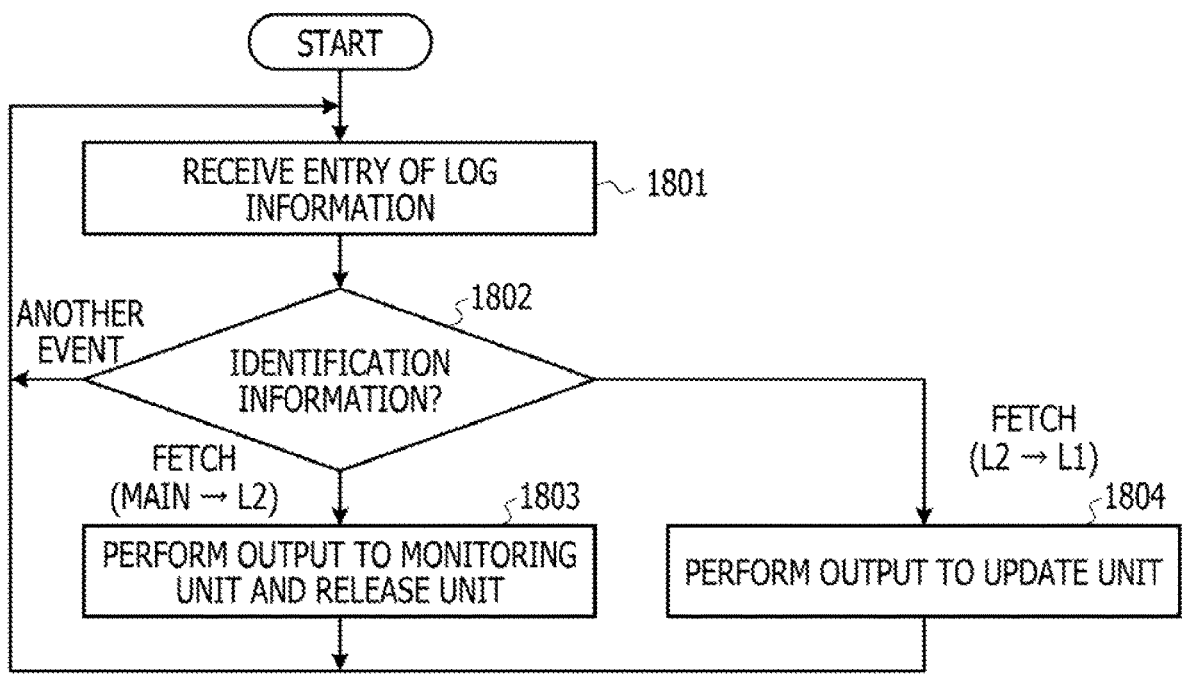
FIG. 18 is a flowchart of operation performed by a distribution unit.

FIG. 18 is a flowchart illustrating exemplary operation performed by the distribution unit 1711 in FIG. 17. First, the distribution unit 1711 receives an entry of the log information 522 from the log control unit 512 (step 1801), and checks identification information of the received entry (step 1802).

In a case where the identification information of the received entry indicates fetch (main→L2), the distribution unit 1711 outputs the entry to the monitoring unit 1712 and to the release unit 1715 (step 1803), and repeats the operations of step 1801 and subsequent steps. In a case where the identification information of the received entry indicates fetch (L2→L1), the distribution unit 1711 outputs the entry to the update unit 1714 (step 1804), and repeats the operations of step 1801 and subsequent steps.

In a case where the identification information of the received entry indicates an event other than the fetch (main→L2) and fetch (L2→L1), the distribution unit 1711 repeats the operations of step 1801 and subsequent steps.

Figure 19:
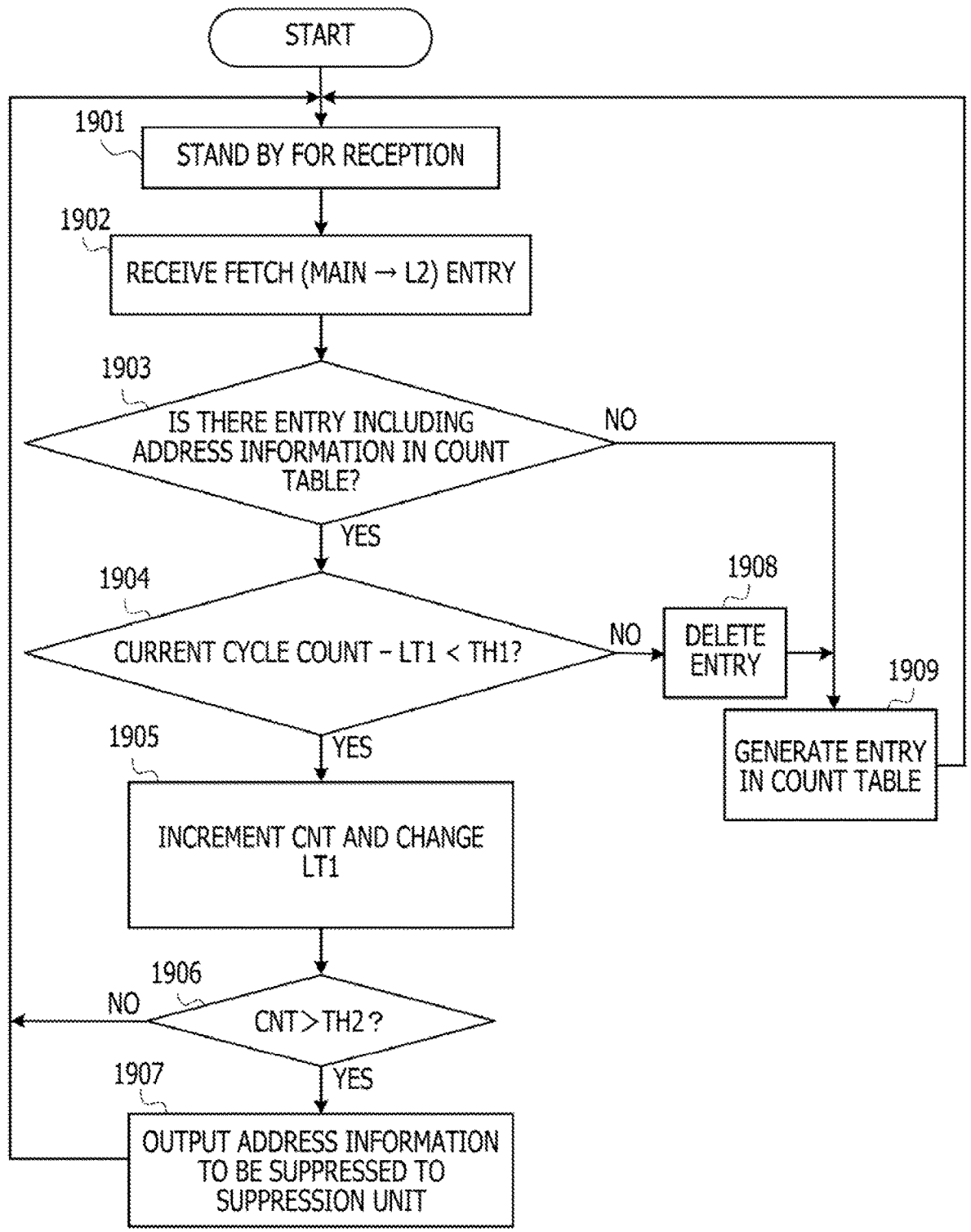
FIG. 19 is a flowchart of operation performed by a monitoring unit.

FIG. 19 is a flowchart illustrating exemplary operation performed by the monitoring unit 1712 in FIG. 17. First, the monitoring unit 1712 stands by for reception (step 1901), and receives a fetch (main→L2) entry from the distribution unit 1711 (step 1902).

Next, the monitoring unit 1712 checks whether or not an entry including the address information of the received entry exists in the count table 1721 (step 1903).

If there is no entry including the address information of the received entry in the count table 1721 (NO in step 1903), the monitoring unit 1712 generates a new entry in the count table 1721 (step 1909). The address information of the received entry is set in the ADDR1 of the new entry, one is set in the CNT, and the current cycle count is set in the ST1 and LT1. Then, the monitoring unit 1712 repeats the operations of step 1901 and subsequent steps.

If there is an entry including the address information of the received entry in the count table 1721 (YES in step 1903), the monitoring unit 1712 performs an operation of step 1904 with the entry existing in the count table 1721 serving as a processing target. In step 1904, the monitoring unit 1712 compares a subtraction result obtained by subtracting the LT1 of the entry to be processed from the current cycle count with a threshold value TH1 representing the validity period of the entry (step 1904).

If the subtraction result is equal to or more than the TH1 (NO in step 1904), the monitoring unit 1712 deletes the entry to be processed from the count table 1721 (step 1908), and performs operations of step 1909 and subsequent steps.

On the other hand, if the subtraction result is less than the TH1 (YES in step 1904), the monitoring unit 1712 increments the CNT of the entry to be processed by one, and changes the LT1 of the entry to the current cycle count (step 1905). Then, the monitoring unit 1712 compares the CNT with a threshold value TH2 representing a predetermined number of times (step 1906).

If the CNT is equal to or less than the TH2 (NO in step 1906), the monitoring unit 1712 repeats the operations of step 1901 and subsequent steps. If the CNT is larger than the TH2 (YES in step 1906), the monitoring unit 1712 deletes the entry to be processed from the count table 1721, and outputs the ADDR1 of the entry to the suppression unit 1713 as address information to be suppressed (step 1907). Then, the monitoring unit 1712 repeats the operations of step 1901 and subsequent steps.

Figure 20:
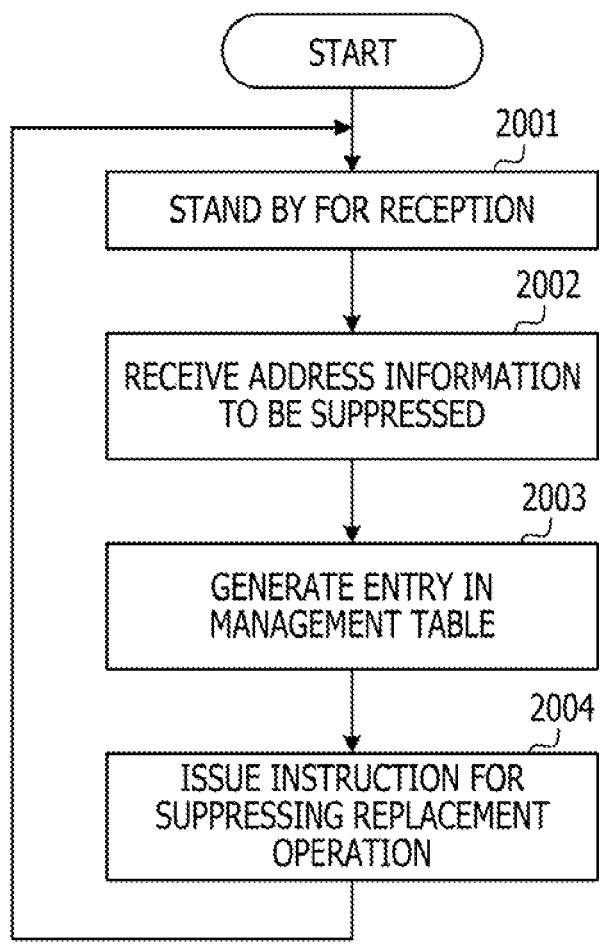
FIG. 20 is a flowchart of operation performed by a suppression unit.

FIG. 20 is a flowchart illustrating exemplary operation performed by the suppression unit 1713 in FIG. 17. First, the suppression unit 1713 stands by for reception (step 2001), and receives address information to be suppressed from the monitoring unit 1712 (step 2002).

Next, the suppression unit 1713 generates a new entry in the management table 1722 (step 2003). The received address information to be suppressed is set in the ADDR2 of the new entry, the current cycle count is set in the ST2 and LT2, and a predetermined wait time is set in the WT.

Next, the suppression unit 1713 instructs the L2 cache 414 to suppress the replacement operation of replacing the data indicated by the address information to be suppressed with another piece of data (step 2004), and repeats the operations of step 2001 and subsequent steps.

Figure 21:
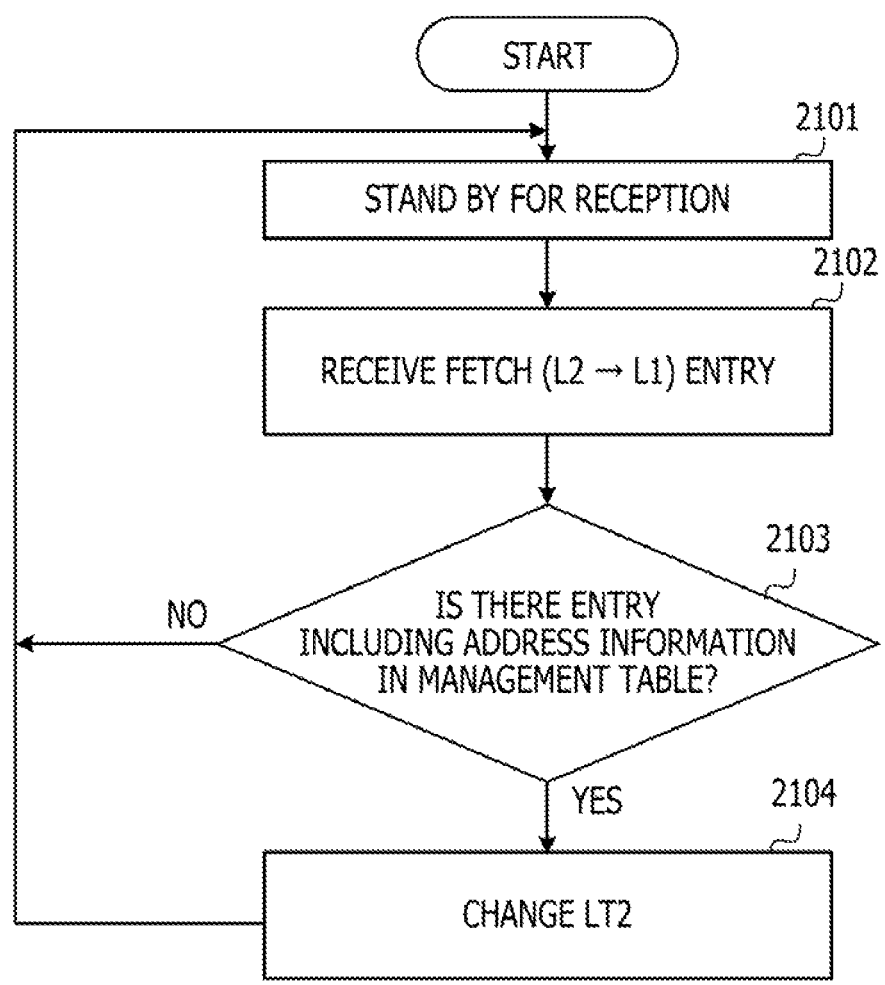
FIG. 21 is a flowchart of operation performed by an update unit.

FIG. 21 is a flowchart illustrating exemplary operation performed by the update unit 1714 in FIG. 17. First, the update unit 1714 stands by for reception (step 2101), and receives a fetch (L2→L1) entry from the distribution unit 1711 (step 2102).

Next, the update unit 1714 checks whether or not an entry including the address information of the received entry exists in the management table 1722 (step 2103). If there is no entry including the address information of the received entry in the management table 1722 (NO in step 2103), the update unit 1714 repeats the operations of step 2101 and subsequent steps.

If there is an entry including the address information of the received entry in the management table 1722 (YES in step 2103), the update unit 1714 changes the LT2 of the entry to the current cycle count (step 2104). Then, the update unit 1714 repeats the operations of step 2101 and subsequent steps.

Figure 22:
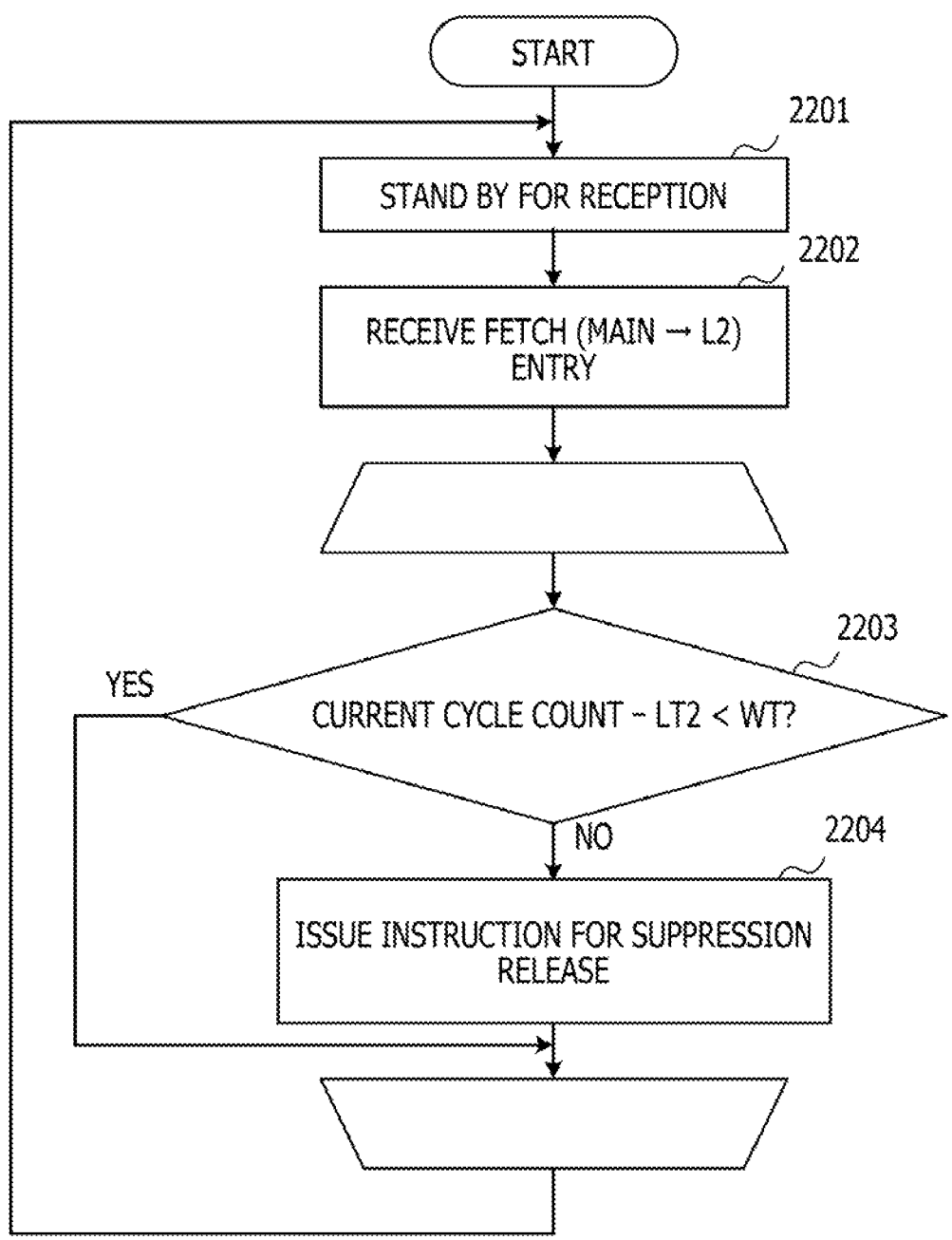
FIG. 22 is a flowchart of operation performed by a release unit.

FIG. 22 is a flowchart illustrating exemplary operation performed by the release unit 1715 in FIG. 17. First, the release unit 1715 stands by for reception (step 2201), and receives a fetch (main→L2) entry from the distribution unit 1711 (step 2202). Next, the release unit 1715 performs operations of steps 2203 and 2204 for each entry in the management table 1722 as a processing target.

In step 2203, the release unit 1715 compares a subtraction result obtained by subtracting the LT2 of the entry to be processed from the current cycle count with the WT of the entry (step 2203).

If the subtraction result is equal to or more than the WT (NO in step 2203), the monitoring unit 1712 deletes the entry to be processed from the management table 1722. Then, the monitoring unit 1712 instructs the L2 cache 414 to release the suppression of the replacement operation for the data indicated by the entry (step 2204).

On the other hand, if the subtraction result is less than the WT (YES in step 2203), the monitoring unit 1712 skips the operation of step 2204.

When the operation of step 2203 or the operations of steps 2203 and 2204 are complete for all the entries in the management table 1722, the release unit 1715 repeats the operations of step 2201 and subsequent steps.

The release unit 1715 may perform the operations of steps 2203 and 2204 at regular intervals using a timer instead of performing the operations of steps 2203 and 2204 when receiving a fetch (main→L2) entry.

Note that, in the information processing device 301 of FIG. 3, one or more different cache memories may be provided between the L2 cache 414 and the memory unit 312. In this case, a cache memory M1 that belongs to the memory hierarchy closest to the memory unit 312 may have a configuration similar to that of the L2 cache 414 of FIG. 5.

When a cache miss occurs in the cache memory M1, fetch from the memory unit 312 to the cache memory M1 is performed. Then, instead of identification information indicating the fetch (main→L2), identification information indicating the fetch from the memory unit 312 to the cache memory M1 is recorded in an entry of the log information 522.

In this case, the determination unit 415 and L2 prefetch unit 416 in FIG. 4 and the L2 prefetch unit 1311 in FIG. 13 performs control for prefetching from the memory unit 312 to the cache memory M1 instead of prefetching from the memory unit 312 to the L2 cache 414.

When a cache miss occurs in the L2 cache 414, fetch from the cache memory M2 belonging to a memory hierarchy lower than that of the L2 cache 414 to the L2 cache 414 may be performed. In this case, instead of identification information indicating the fetch (main→L2), identification information indicating the fetch from the cache memory M2 to the L2 cache 414 is recorded in an entry of the log information 522.

Then, the replacement control unit 1413 controls the replacement operation in the L2 cache 414 using the number of times the L2 cache 414 has received specific data from the cache memory M2 instead of the number of times the L2 cache 414 has received the specific data from the memory unit 312.

The cache memory M2 may have a configuration similar to that of the L2 cache 414 of FIG. 5. When a cache miss occurs in cache memory M2, fetch from a cache memory M3 belonging to a memory hierarchy lower than that of the cache memory M2 to the cache memory M2 may be performed. Then, instead of identification information indicating the fetch (main→L2), identification information indicating the fetch from the cache memory M3 to the cache memory M2 is recorded in an entry of the log information 522.

Then, the replacement control unit 1413 controls the replacement operation in the cache memory M2 using the number of times the cache memory M2 has received specific data from the cache memory M3 instead of the number of times the L2 cache 414 has received the specific data from the memory unit 312.

The information processing device 301 may not be provided with the L2 cache 414. In this case, the L1 cache 413 may have a configuration similar to that of the L2 cache 414 of FIG. 5. When a cache miss occurs in the L1 cache 413, fetch from the memory unit 312 to the L1 cache 413 is performed.

Then, instead of the identification information indicating the fetch (main→L2), identification information indicating the fetch from the memory unit 312 to the L1 cache 413 is recorded in an entry of the log information 522.

The L1 cache 413 and the L2 cache 414 in FIGS. 4 and 13 are also capable of storing instructions instead of data. In this case, a packet transmitted/received between the L1 cache 413 and the L2 cache 414 or between the L2 cache 414 and the memory unit 312 includes event information, a target instruction to be a target of an event, and a physical address of the target instruction. Then, the determination unit 415, the L2 prefetch unit 416, and the L2 prefetch unit 1311 perform operation for prefetching the instruction instead of data.

The configurations of the information processing device 101 of FIG. 1 and information processing device 301 of FIG. 3 are merely examples, and some constituent elements may be omitted or modified depending on the use or conditions of the image processing device.

The configurations of the arithmetic processing units 311 in FIGS. 4 and 13 are merely examples, and some constituent elements may be omitted or modified depending on the use or conditions of the information processing device 301. For example, the replacement control unit 1413 in FIG. 14 may be added to the arithmetic processing unit 311 of FIG. 4. The configuration of the L2 cache 414 of FIG. 5 is merely an example, and some constituent elements may be omitted or modified depending on the use or conditions of the information processing device 301.

The configuration of the table control unit 511 of FIG. 9 is merely an example, and some constituent elements may be omitted or modified depending on the use or conditions of the information processing device 301. The configuration of the log control unit 512 of FIG. 11 is merely an example, and some constituent elements may be omitted or modified depending on the use or conditions of the information processing device 301.

The configuration of the determination unit 415 of FIG. 12 is merely an example, and some constituent elements may be omitted or modified depending on the use or conditions of the information processing device 301. The configuration of the L2 prefetch unit 1311 of FIG. 14 is merely an example, and some constituent elements may be omitted or modified depending on the use or conditions of the information processing device 301. For example, in a case where replacement of data in the L2 cache 414 does not need to be suppressed, the replacement control unit 1413 may be omitted.

The configuration of the determination unit 1411 of FIG. 15 is merely an example, and some constituent elements may be omitted or modified depending on the use or conditions of the information processing device 301. The configuration of the replacement control unit 1413 of FIG. 17 is merely an example, and some constituent elements may be omitted or modified depending on the use or conditions of the information processing device 301. It is also possible to suppress data replacement in the L1 cache 413 using hardware similar to the replacement control unit 1413.

The flowcharts of FIG. 2 and FIGS. 18 to 22 are merely examples, and some steps may be omitted or modified depending on the configuration or conditions of the information processing device 301. The prefetching operation in FIG. 16 is merely an example, and some steps may be omitted or modified depending on the configuration or conditions of the information processing device 301.

The conversion table 521 illustrated in FIG. 6 is merely an example, and the conversion table 521 changes depending on the program. The virtual address and physical address illustrated in FIG. 7 are merely examples, and the virtual address and the physical address change depending on the configuration or conditions of the information processing device 301. The log information 522 illustrated in FIG. 8 is merely an example, and the log information 522 changes depending on the program. The update information illustrated in FIG. 10 is merely an example, and a format of the update information changes depending on a format of the conversion table 521.

While the disclosed embodiment and the advantages thereof have been described in detail, those skilled in the art will be able to make various modifications, additions, and omissions without departing from the scope of the embodiment as explicitly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising an arithmetic processing unit, the arithmetic processing unit including:
   a processor that executes a program;
   a first cache memory;
   a second cache memory that belongs to a memory hierarchy lower than a memory hierarchy of the first cache memory;
   a determination unit that determines, on a basis of first information that indicates a virtual address of information accessed in the second cache memory when the program is executed, second information that indicates a virtual address of target information to be prefetched; and
   a prefetch unit that prefetches the target information and stores the prefetched target information in the second cache memory,
   wherein the second cache memory includes a conversion unit that converts, by using correspondence information that indicates a correspondence relationship between the physical address of the target information and the virtual address of the target information, the second information into third information that indicates a physical address of the target information, and
   the prefetch unit prefetches the target information using the third information.

2. The information processing device according to claim 1, wherein
   the prefetch unit transmits fourth information that indicates a physical address of the accessed information to the conversion unit, and
   the conversion unit converts the fourth information into the first information using the correspondence information, and transmits the first information to the determination unit.

3. The information processing device according to claim 1, wherein
   the first information includes information that indicates a virtual page number of the accessed information,
   the second information includes information that indicates a virtual page number of the target information,
   the third information includes information that indicates a physical page number of the target information, and the determination unit uses, as the second information, information that indicates a virtual page number that corresponds to a next virtual page of a virtual page that corresponds to the virtual page number indicated by the first information.

4. The information processing device according to claim 1, wherein the conversion unit converts a physical address of each of a plurality of pieces of the information accessed in the second cache memory into a virtual address, the second cache memory further includes a control unit that transmits, to the determination unit, information that indicates the virtual address of each of the plurality of pieces of accessed information, the determination unit includes:

a storage unit that stores the information that indicates the virtual address of each of the plurality of pieces of accessed information as access history information; and a prediction unit that predicts the second information on a basis of the access history information, and the access history information includes the first information.

5. The information processing device according to claim 1, further comprising:

a memory unit that stores specific information, wherein the arithmetic processing unit further includes:

a monitoring unit that monitors a number of times the second cache memory has received the specific information from the memory unit or a cache memory that belongs to a memory hierarchy lower than the memory hierarchy of the second cache memory; and a suppression unit that instructs the second cache memory to suppress replacement operation that replaces the specific information with another piece of information in a case where the number of times the specific information has been received exceeds a predetermined number of times.

6. The information processing device according to claim 5, wherein the arithmetic processing unit further includes a release unit that instructs the second cache memory to release suppression of the replacement operation in a case where the specific information has not been transmitted from the second cache memory to the first cache memory for a certain period of time.

7. A computer-implemented information processing method performed by an arithmetic processing unit, the method comprising:

executing a program;

in response that the program is executed, determining, on a basis of first information that indicates a virtual address of information accessed in a second cache memory that belongs to a memory hierarchy lower than a memory hierarchy of a first cache memory, second information that indicates a virtual address of target information to be prefetched;

converting, by using correspondence information that indicates a correspondence relationship between the physical address of the target information and the virtual address of the target information, the second information into third information that indicates a physical address of the target information;

prefetching the target information using the third information; and storing the prefetched target information in the second cache memory.

* * * * *